Patented Dec. 31, 1935

2,026,493

UNITED STATES PATENT OFFICE 2,026,493

BRONZING LACQUER

Denis J. Burke, London, England, assignor to Commercial Solvents Corporation, Terre Haute, Ind., a corporation of Maryland No Drawing. Application March 18, 1935, Serial No. 11,686

7 Claims. (Cl. 134—79)

My invention relates to improvements in bronzing lacquers having a nitrocellulose base. More specifically, my invention relates to an improved type of bronzing lacquer not subject to the usual defect of rapid gelling.

A bronzing lacquer consists essentially of a suspension of bronze powder in a nitrocellulose solution or "bronzing liquid". The usual solvent mixtures are employed in these bronzing liquids, and nitrocellulose of the high viscosity or "bronzing cotton" type is usually used although cotton of lower viscosity may also be used. Gums and plasticizers are added in some cases to improve the adhesion of the film to the under surface, and to improve its elasticity. The bronze powder is usually not added to this mixture during its preparation, but is stirred into the finished liquid just before it is desired to use the lacquer. The reason for this procedure is the tendency of all bronzing lacquers to form gells shortly after the admixture of the bronze powder. The life of the lacquer, e. g., the length of time before gelling occurs depends upon the concentration and type of bronze used, the grade of cotton, the strength of the solvent mixture, and other factors. In general, however, gell formation takes place in less than ten days, and usually in from two hours to two days. The entire lacquer will gell if the bronze has remained suspended, but if it has settled, the gell will be formed only at the bottom, in the vicinity of the bronze powder. This gell, although often soluble in additional strong solvents, in a great many cases, cannot be dispersed by further addition of the usual solvent mixtures or by any mechanical means. For this reason, the tendency to form such gells obviously detracts from the usefulness of bronzing lacquers.

Although no adequate explanation has been offered for this phenomenon, a number of preventative agents have been recommended to overcome it. Most of these agents, however, have failed to accomplish their purpose and some, such as sodium carbonate, not only have no beneficial action, but are in reality deterimental and tend to cause gell formation. Others, although capable of preventing gelling, possess other disadvantages which make their use impractical. All of the agents thus far recommended have been either acidic or alkaline in nature and up to the present time no suitable neutral materials have been discovered.

I have now found that the esters and salts of malic acid are powerful inhibiting agents, possessing none of the disadvantages of the previously recommended materials. For example, potassium malate will prevent gelling in certain cases if employed in as small amounts as 0.1% of the total weight of the bronzing liquid. In general, an addition of a malic acid salt or ester in a concentration equivalent to 0.5% to 2.0% of potassium malate will prevent gelling for considerable lengths of time. For example, an inhibitor concentration corresponding to 0.7% by weight of potassium malate will be found to prevent the gelling of most types of bronzing lacquers for a period of at least 15 days and in most cases for 60 days or longer. Lacquers containing no inhibitor, on the other hand, will be found to gell in 2 days in most instances and almost invariably in 10 days.

The bronzing lacquers in which malic acid salts or esters may be satisfactorily used as anti-gell agents may be of any of the usual types. The nitrocellulose may be the ½ second or 4 second type, or a high viscosity cotton such as 40 or 70 second bronzing cotton. The usual plasticizers, such as dibutyl phthalate, castor oil, or lindol may be used. Gums such as dammar, ester gum, elemi, or synthetic resins may be incorporated in the lacquers. The bronze powder may be the various copper-zinc alloys, mixtures of such powders, or such powders with pigments or dyes incorporated in them. These powders are usually mixed with a little thinner and then added to the finished bronzing liquid. The bronze is added in proportions which may vary over a wide range, depending upon the particular type of lacquer desired. For 100 parts of nitrocellulose, 10 to 1,000 parts or more of bronze powder may be used. However, 100 to 200 parts are satisfactory for most purposes. The solvent mixtures usually used contain esters, alcohols, hydrocarbons, and, if desired, carbonyl compounds or ethers. Esters such as ethyl acetate, butyl acetate, or butyl propionate; carbonyl compounds such as furfural, acetone, or diacetone alcohol, and ethers such as the mono ethyl ether of ethylene glycol or the mono-butyl ether of ethylene glycol are used as nitrocellulose solvents. The alcohols such as ethanol, butanol, or cyclohexanol, are used to dissolve the gums, or as activating solvents. The hydrocarbons such as benzol, toluol, or naphtha, are used to dissolve gums or to serve as cheap diluents. It is also desirable that a certain amount of high-boiling solvents such as butyl acetate, butyl propionate, or amyl acetate be present to promote good flow and prevent "blushing."

The inhibiting agent is incorporated in the bronzing fluid generally in proportions of from approximately 2% to approximately 25% the weight of the cotton. In most instances I prefer to use the inhibitor in a proportion of substantially 5–15% the weight of the cotton. Of course, in special cases the limits may be much greater; under certain conditions the inhibitor may be employed in proportions of 0.1% to 100% or more of the cotton. For example, if a large amount of bronze powder is used, more inhibitor is needed than if only a small amount of the powder were present, and with a weak solvent mixture more of the inhibitor is required than with the use of a more powerful mixture.

*Examples*

The following are type formulæ for bronzing lacquers in which malic acid salts or esters are incorporated to prevent gelling:

I

| | Parts |
|---|---|
| Nitrocellulose (½ second) | 10 |
| Ester gum | 5 |
| Dibutyl phthalate | 3 |
| Bronze powder | 15 |
| Sodium malate | 0.2 to 2.5 | in 100 parts of a solvent mixture consisting of

| | Percent |
|---|---|
| Butyl acetate | 25 |
| Butanol | 15 |
| Ethyl acetate | 15 |
| V. M. P. naphtha | 45 |

II

| | Parts |
|---|---|
| Bronzing cotton | 7 |
| Ester gum | 3 |
| Castor oil | .2 |
| Bronze powder | 15 |
| Ethyl malate | 0.2 to 2.5 | in 100 parts of a solvent mixture consisting of

| | Percent |
|---|---|
| Butyl acetate | 15 |
| Butanol | 10 |
| Ethyl acetate | 10 |
| Ethyl alcohol | 10 |
| Toluol | 55 |

III (*Flexible*)

| | Parts |
|---|---|
| Bronzing cotton | 6 |
| Elemi | 5 |
| Castor oil | 4 |
| Bronze powder | 10 |
| Potassium malate | 0.2 to 2.5 | in 100 parts of a solvent mixture consisting of

| | Percent |
|---|---|
| Butyl acetate | 20 |
| Butanol | 10 |
| Ethyl acetate | 10 |
| Xylol | 30 |
| Toluol | 30 |

While I do not know the exact mechanism whereby the malic acid salts and esters prevent the gelling of bronzing liquids it appears their beneficial effect may be due to their precipitation of the small amounts of metal or oxide from the bronze which go into solution, thus converting this material into a form which does not readily enter into chemical reaction with the nitrocellulose. Indications are that due to the action of either the metal or the oxide present on its surface the nitrogen content of the nitrocellulose is lowered, giving a product which is insoluble in all but the most powerful solvents and solvent mixtures. Precipitation therefore results and takes the form of gelling, this portion of the nitrocellulose forming the closed phase. All of the nitrocellulose is not necessarily affected since the gelling might be caused by the precipitation of only a minute amount of solid material and the consequent setting up of a structure enclosing the portion of the solution not affected. It is believed that the beneficial effect of the preventative is due to the precipitation of the small amounts of metal or oxide which go into solution, their removal from the system thus preventing any chemical action between them and the nitrocellulose. This theory is substantiated at least in part by the fact that the inhibiting effect is not dependent upon either alkalinity or acidity, as such.

It is to be understood that while my invention is substantially described by the above disclosure and examples, it is not to be construed as limited to the use of the substances or combinations specifically named. Malic acid salts and esters other than those in the above examples may, of course, be employed. For example, among the suitable esters there may be mentioned the propyl, butyl, amyl, and benzyl esters. In general, however, I prefer to utilize the aliphatic esters and the alkali metal salts.

The present application is a continuation-in-part of my application Ser. No. 418,651, filed January 4, 1930.

Now, having described my invention, what I claim is:

1. A bronzing lacquer containing as gell preventative at least one material selected from the group consisting of esters and salts of malic acid, in an amount sufficient to prevent gelling of the composition and insufficient to effect deleteriously the composition as a whole.

2. A nitrocellulose bronzing lacquer containing as gell preventative at least one material selected from the group consisting of esters and salts of malic acid, in an amount sufficient to prevent gelling of the composition and insufficient to affect deleteriously the composition as a whole.

3. A nitrocellulose bronzing lacquer containing as gell preventative an aliphatic ester of malic acid in an amount sufficient to prevent gelling of the composition and insufficient to affect deleteriously the composition as a whole.

4. A nitrocellulose bronzing lacquer containing as gell preventative ethyl malate in an amount sufficient to prevent gelling of the composition and insufficient to affect deleteriously the composition as a whole.

5. A nitrocellulose bronzing lacquer containing as gell preventative an alkali metal salt of malic acid in an amount sufficient to prevent gelling of the composition and insufficient to affect deleteriously the composition as a whole.

6. A nitrocellulose bronzing lacquer containing as gell preventative sodium malate in an amount sufficient to prevent gelling of the composition and insufficient to affect deleteriously the composition as a whole.

7. A nitrocellulose bronzing lacquer containing as gell preventative potassium malate in an amount sufficient to prevent gelling of the composition and insufficient to affect deleteriously the composition as a whole.

DENIS J. BURKE.